(12) United States Patent
Giese

(10) Patent No.: US 7,294,809 B2
(45) Date of Patent: Nov. 13, 2007

(54) CONFIGURABLE SECURING ASSEMBLY FOR NECK OF WELDING GUN

(75) Inventor: William R. Giese, Beecher, IL (US)

(73) Assignee: Illinois Tool Works Inc., Glenview, IL (US)

(*) Notice: Subject to any disclaimer, the term of this patent is extended or adjusted under 35 U.S.C. 154(b) by 507 days.

(21) Appl. No.: 10/278,319

(22) Filed: Oct. 23, 2002

(65) Prior Publication Data

US 2004/0079784 A1 Apr. 29, 2004

(51) Int. Cl.
*B23K 9/00* (2006.01)
(52) U.S. Cl. .............................. 219/137.31; 219/137.63
(58) Field of Classification Search ........... 219/137.31, 219/137.63; 403/373, 374.1, 374.2
See application file for complete search history.

(56) References Cited

U.S. PATENT DOCUMENTS

| | | | | |
|---|---|---|---|---|
| 5,350,266 A | * | 9/1994 | Espey et al. ................ | 411/431 |
| 5,384,447 A | * | 1/1995 | Raloff et al. ............ | 219/137.31 |
| RE36,997 E | * | 12/2000 | Kensrue ................. | 219/137.31 |
| 6,649,871 B2 | * | 11/2003 | Wakeman ............... | 219/137.31 |
| 6,713,711 B2 | * | 3/2004 | Conway et al. ......... | 219/121.48 |
| 6,720,528 B1 | * | 4/2004 | Matiash et al. ......... | 219/137.31 |

* cited by examiner

*Primary Examiner*—Kevin P. Kerns
(74) *Attorney, Agent, or Firm*—Fletcher Yoder

(57) ABSTRACT

A welding system having a welding implement. The welding implement having a neck, a handle and a retaining nut for securing the neck to the handle. The neck being operable to convey electrode wire therethrough. The retaining nut being adapted for wrench-tightening to a threaded portion of the welding implement. An optional retaining nut operator. The optional retaining nut operator being adapted to secure to the retaining nut. The optional retaining nut operator being adapted for manual rotation to thread the retaining nut to the threaded portion of the welding implement. The optional retaining nut operator may be adapted to snap-fit onto the retaining nut. The optional retaining nut operator may include an electrically insulating material. The electrically insulating material may include a polymer.

27 Claims, 3 Drawing Sheets

CONFIGURABLE SECURING ASSEMBLY FOR NECK OF WELDING GUN

FIELD OF THE INVENTION

The present invention relates generally to arc welding systems, and particularly to a wire-feed welding system having a welding gun.

BACKGROUND OF THE INVENTION

Welding is a common manufacturing process used to join, or to separate, metal work pieces. Arc welding is a common type of welding method. An arc welding system typically comprises a power supply coupled to a welding gun or torch housing an electrode. A welding cable may be used to couple the welding gun to the power supply. A conductive cable and a clamp may be used to couple a work piece to the power supply. A circuit between the power supply and work piece is completed when the electrode is placed against, or in proximity to, the work piece, producing an electric arc between the electrode and the work piece. The heat of the electric arc is concentrated on the work piece, or pieces, to be joined. The heat of the arc melts the metal piece, or pieces. A filler material may be added to the molten metal. The molten mass cools and solidifies when the arc is removed, forming the weld.

There are many different types of arc welding, such as metal-inert-gas ("MIG") welding and submerged arc welding. In MIG and submerged arc welding, a metal wire is used as the electrode. Additionally, the electrode wire may act as filler material for the weld. The wire is fed from a wire feeder coupled to the power supply. In MIG welding, the electrode wire is shielded at the point of contact by an inert gas. In submerged arc welding, a powdery flux is used to shield the electrode wire at the point of contact. The inert gas and flux shields the molten metal at the point of contact from outside contaminants and gases that may react with the molten material. Non-inert gases, such as $CO_2$, also may be used in MIG welding systems.

The wire and gas typically are fed through a welding gun having a welding cable. The welding cable receives the wire from a wire feeder and gas from a gas cylinder. The welding cable also has additional conductors to assist the wire in conducting power from the power source. The welding gun typically has a handle and neck that are used to direct gas or flux and wire towards a work piece. A retaining nut typically is used to secure a neck to a connector coupled to the welding cable. The connector enables electricity to flow from the welding cable to an inner portion of the neck. If the retaining nut loosens, the area of contact between the neck and the connector and/or welding cable will decrease. This increases the electrical resistance between the neck and the welding cable. In some applications, such as with electrical currents above 400 amps, the increase in electrical resistance results in the production of a substantial amount of resistive heating. The heat from the resistive heating produced at the interface may heat up the handle to the point where it cannot be held. Consequently, it may be desirable to wrench tighten the retaining nut so that neck does not come loose. However, hand-tightening the retaining nut to the connector is sufficient in many applications and does not require a tool to perform.

There exists then a need for a method of securing a neck to a welding implement that provides an assembler with the option of configuring the welding implement for either wrench-tightening or hand-tightening a securing nut for the neck.

SUMMARY OF THE INVENTION

The present technique provides a novel technique designed to respond to such needs. According to one aspect of the present technique, a welding system is provided. The welding system comprises a welding implement having a neck adapted to convey electrode wire therethrough. The welding implement comprises an operator securable to a wrench-tightenable retaining nut to enable a user to hand tighten the retaining nut to secure the neck to the welding gun. The hand operator may be an optional attachment adapted to be disposed over the retaining nut. The hand operator may be adapted to secure to the retaining nut when disposed over the retaining nut. In one embodiment of the present technique, the retaining nut is adapted to be wrench-tightened and to enable the hand operator to be attached to the retaining nut.

According to another aspect of the present technique, a method of assembling a welding implement is featured. The welding implement comprises a neck secureable to the welding implement by a retaining nut. The retaining nut may be adapted to be wrench-tightened. The method may comprise disposing an operator to a retaining nut to enable a user to hand tighten the retaining nut to secure the neck to the welding implement.

BRIEF DESCRIPTION OF THE DRAWINGS

The invention will hereafter be described with reference to the accompanying drawings, wherein like reference numerals denote like elements, and.

DETAILED DESCRIPTION OF THE PREFERRED EMBODIMENTS

Figure 1:
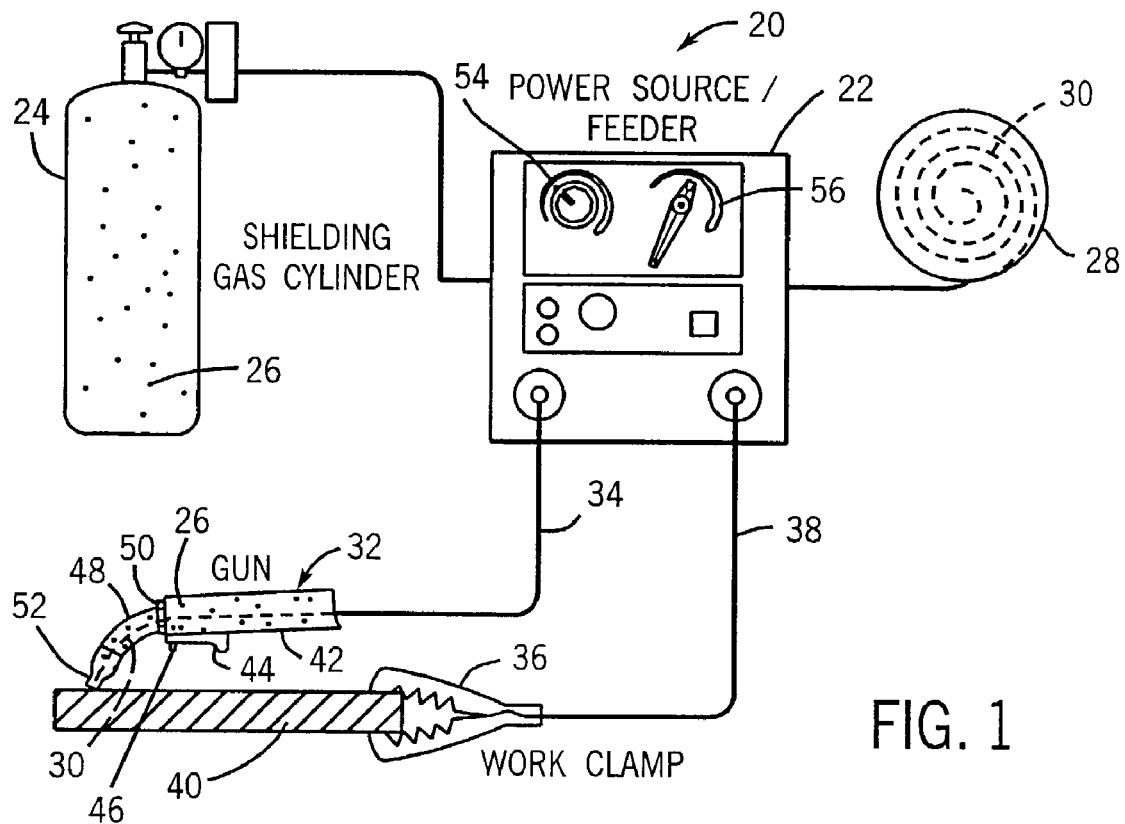
FIG. 1 is a diagram of a MIG welding system, according to an exemplary embodiment of the present technique.

Referring generally to FIG. 1, an exemplary metal inert gas ("MIG") welding system 20 is illustrated. However, the present technique also is operable with other types of welding systems, such as submerged arc welding systems. The illustrated welding system 20 comprises a combination power source/wire feeder 22. However, a separate power source and wire feeder also may be used. The illustrated welding system also comprises a gas cylinder 24 containing a gas 26 that is coupled to the power source/wire feeder 22. A spool 28 of electrode wire 30 also is coupled to the power source/wire feeder 22. The electrode wire 30 and gas 26 are coupled to a welding gun 32 having a welding cable 34. However, the present technique is applicable with welding implements other than a welding gun, such as a robotic welder.

In the illustrated embodiment, the welding cable 34 is adapted to receive gas 26 and electrode wire 30. Additionally, in this embodiment, the welding cable 34 has a plurality of conductors that, along with the electrode wire 30, couple electricity from the power source 22 to the welding gun 32. The additional conductors prevent the electrode wire from having to carry the entire electrical current load, which could lead to failure of the electrode wire. In addition, the additional conductors reduce resistive heating losses. The work clamp 36 is clamped onto the conductive work piece 40 to be welded. The work clamp 36 and the ground cable 38 electrically couple the power source/wire feeder 22 to the work piece 40. Additionally, the wire 30 within the welding cable 34 is electrically coupled to the power source/wire feeder 22. The welding gun 32 is used to direct the gas and wire toward the work piece 40 and to control the supply of gas 26 and wire 30 from the power source/wire feeder 22.

The electrical circuit is completed when the electrode wire 30 contacts, or is brought into proximity with, the work piece 40. Electricity from the power source 22 flows through the electrode wire 30 and work piece 40, producing an arc. The electric arc produces heat that melts the work piece 40 in a region surrounding the point of contact between the wire 30 and the work piece 40. The wire 30 also acts as filler material. The heat of the arc melts the wire 30 along with the work piece 40. The inert gas 26 forms a shield that prevents harmful chemical reactions from occurring at the weld site. When the arc is removed, the work piece 40 and the filler material solidify, forming the weld.

Figure 2:
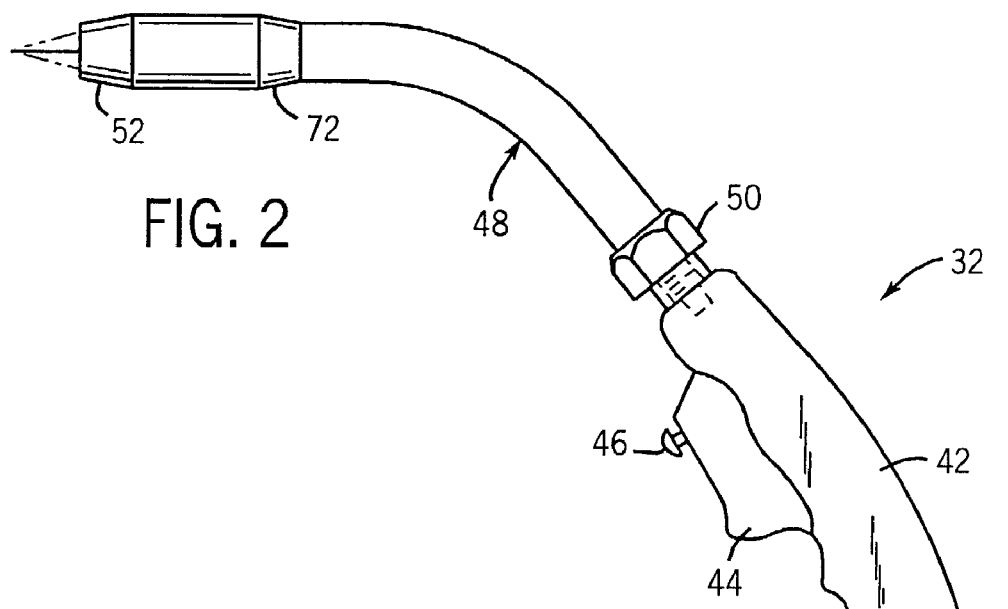
FIG. 2 is an elevational view of a welding gun having a retaining nut, according to an exemplary embodiment of the present technique.

Referring generally to FIGS. 1 and 2, the welding gun 32 comprises a handle 42, a trigger 44, a trigger lock 46, a neck 48, a retaining nut 50, and a nozzle assembly 52. In this embodiment, the handle 42 comprises two handle pieces secured to each other around the welding cable 34 to form the handle 42. The welding cable 34 also has an electrical cable (not shown) that is electrically coupleable to the trigger 44 to enable the trigger 44 to control the power source/wire feeder 22. In this embodiment, a number of events occur when the trigger 44 is operated. One event is that the power source/wire feeder 22 draws in wire 30 from the wire spool 28 and feeds it though the welding cable 34 to the neck 48 of the welding gun 32. Gas 26 also flows from the gas cylinder 24 flows through the welding cable 34 to the neck 48 of the welding gun 32.

In addition, electricity from the power source/wire feeder 22 is supplied to the conductors in the welding cable 34 and conducted to the neck 48 of the welding gun 32. Preferably, the neck 48 comprises copper. The nozzle assembly 52 is coupled to the opposite end of the neck 48 and is adapted to direct wire 30 and gas 26 towards the work piece 40. In addition, the nozzle assembly 52 has a contact tip (not shown) that is adapted to conduct the electricity flowing through the neck 48 to the electrode wire 30. The nozzle assembly 52 may also have a gas diffuser to provide optimal gas flow properties.

The trigger lock 46 is operable to secure the trigger 44 engaged so that a user need not actively hold the trigger 44 engaged during prolonged periods of operation. When the trigger 44 is released, gas 26, wire 30, and electrical power are no longer fed to the welding gun 32. A voltage control 54 and a wire speed control 56 are provided to enable a user to vary the voltage applied to the electrode wire 30 by the power source/wire feeder 22 and the speed that the wire 30 is fed from the power source/wire feeder 22.

In the illustrated embodiment, the neck 48 is secured to the welding handle 42 by threading the retaining nut 50 to a threaded portion 58 of the welding cable 34. However, the neck 48 may be threaded to another portion of the welding gun. For example, the welding cable 34 and neck 48 may be coupled through a separate threaded connector. The retaining nut 50 is adapted to be wrench-tightened to the threaded portion 58 (see FIG. 4) of the welding cable 34. Preferably, the retaining nut 50 comprises metal. However, other materials may be used. Of the metals, brass is preferred. However, other metals, such as aluminum and steel may be used. A boot (not shown) comprised of an electrically insulating material may be disposed over the retaining nut 50.

Figure 3:
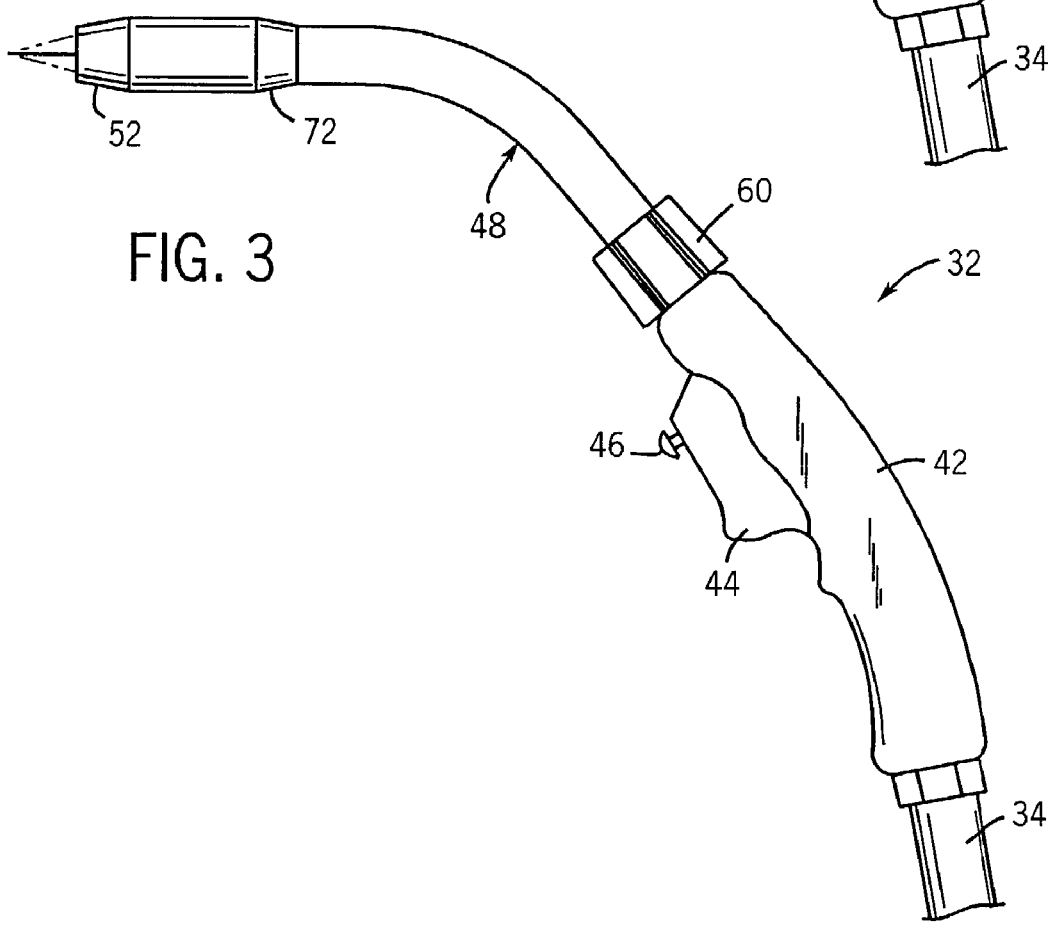
FIG. 3 is an elevational view of a welding gun having a hand operator disposed over a retaining nut, according to an exemplary embodiment of the present technique.
Figure 4:
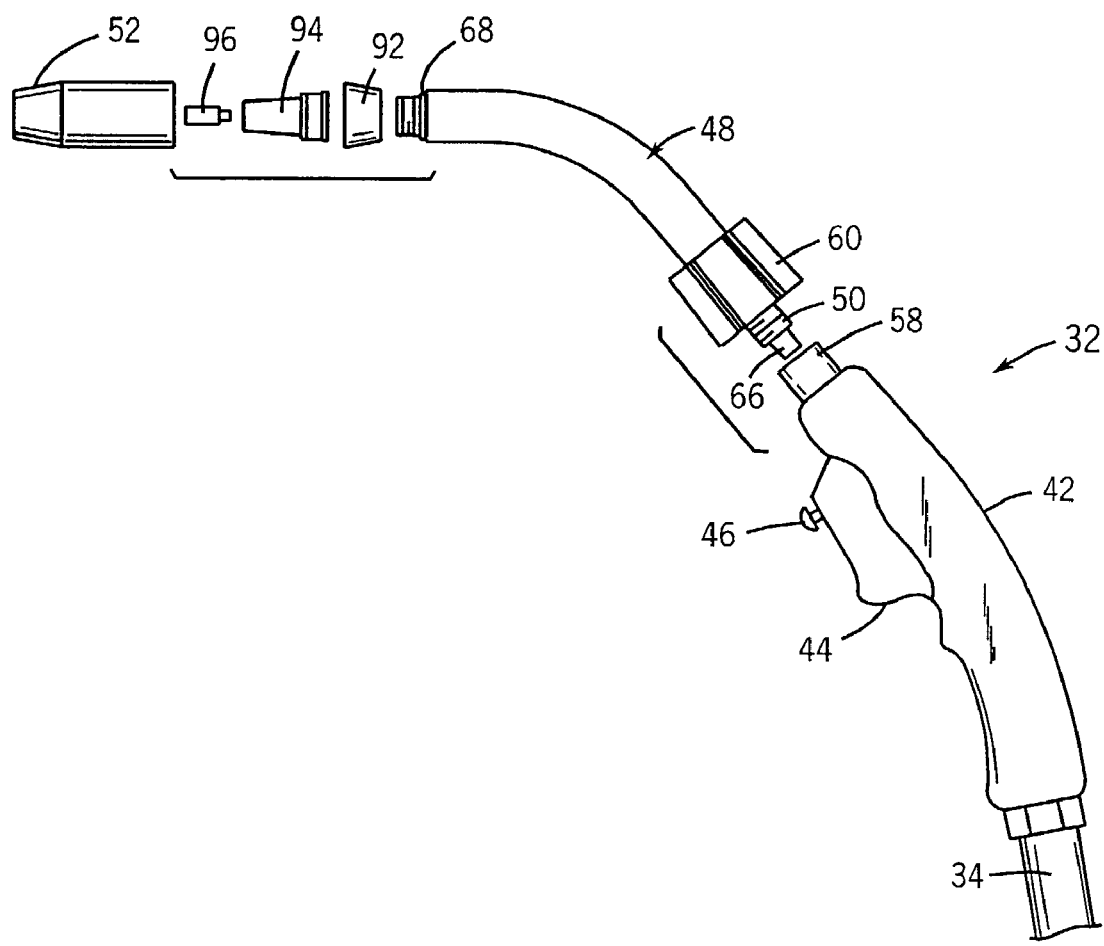
FIG. 4 is an elevational view illustrating the attachment of the neck of FIG. 3 to the welding handle, according to an exemplary embodiment of the present technique.

Referring generally to FIGS. 3 and 4, a hand operator 60, rather than a boot, is disposed over the retaining nut 50 in the illustrated embodiment. The hand operator 60 is adapted to enable a user to hand-tighten, rather than wrench-tighten, the retaining nut 50 onto the threaded portion 58 of the welding cable 34. Preferably, the hand operator 60 is comprised of an electrically insulating material, such as a polymer. For example, the hand operator 60 may be comprised of a glass-filled nylon or a glass-filled polycarbonate. The hand operator 60 may be secured to the retaining nut 50 by the manufacturer or provided to a customer to enable a customer to elect whether or not to install the hand operator 60.

Figure 5:
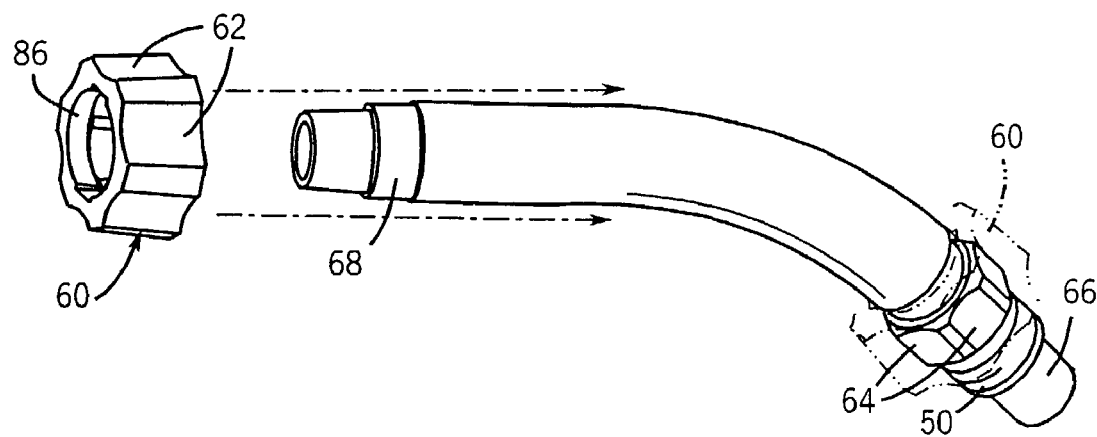
FIG. 5 is an elevational view of a welding gun neck and retaining nut, according to an exemplary embodiment of the present technique.

As illustrated in FIG. 5, the hand operator 60 is adapted to slide over the neck 48. The neck assembly 52 may be removed to facilitate the installation of the hand operator 60. The hand operator 60 has a plurality of indentations 62 disposed around the circumference of the hand operator 60 to enable a user to hand-tighten the retaining nut 50. In this embodiment, the indentations 62 are curved to receive the digits of a users hand so that a user may rotate the hand operator 60, as well as the retaining nut 50, easily when the hand operator 60 is secured to the retaining nut 50. In addition, the indentations 62 provide leverage to enable a user to provide force to tighten the retaining nut 50 onto the threaded portion 58 of the welding cable 34. The retaining nut 50 is adapted with a plurality of faces 64 to enable a wrench to be used to tighten the retaining nut 50 onto the threaded portion 58 of the welding cable 34. The neck 48 has a first end 66 that is adapted to be inserted into a portion of the welding cable 34. The neck 48 has a second end 68 that is adapted to receive the nozzle assembly 52. In the illustrated embodiment, to secure the neck 48 to the handle 42, the first end 66 of the neck 48 is placed within the threaded portion 58 of the welding cable 34. The retaining nut 50 then is threaded into the threaded portion 58 of the welding cable 34.

Figure 6:
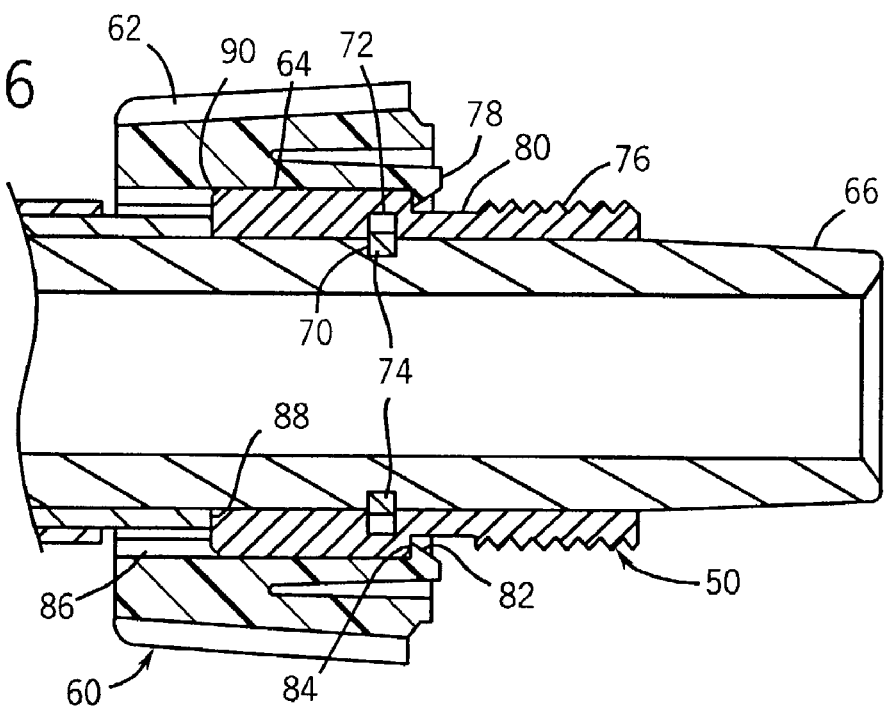
FIG. 6 is a cross-sectional view of the retaining nut and hand operator of FIG. 5, according to an exemplary embodiment of the present technique.

As illustrated in FIG. 6, the neck 48 is adapted with a first groove 70 and the retaining nut 50 is adapted with a corresponding second groove 72. A retaining ring 74, such as a snap ring, is disposed within the grooves to secure the retaining nut 50 to the neck 48. The illustrated retaining ring 74 allows the retaining nut 50 to rotate relative to the neck 48. The retaining nut 50 also has a threaded portion 76 that is adapted for threaded engagement with the threaded portion 58 of the welding cable 34. As the retaining nut 50 is threaded with the threaded portion 58 of the welding cable 34, the retaining nut 50 urges the retaining ring 74, and thus neck 48, towards the welding cable 34, forming a seal between the neck 48 and the welding cable 34.

In the illustrated embodiment, the hand operator 60 is securable to the retaining nut 50 without the use of tools. The hand operator 60 is adapted to slide over and snap-fit onto the retaining nut 50. The illustrated embodiment of the hand operator 60 is adapted with a plurality of fingers 78 that are adapted to flex as the hand operator 50 is slid over the retaining nut 50 and snap into a securing groove 80 in the retaining nut 50, securing the hand operator 60 to the retaining nut 50. In this embodiment, the fingers 78 are adapted with a catch portion 82 adapted to abut a surface 84 of the securing groove 80. The hand operator 60 also has a rear lip 86 adapted to abut against a rear surface 88 of the retaining nut 50 to urge the retaining nut 50 towards the threaded connector 58. The hand operator 60 also is adapted to contact the faces 64 of the retaining nut 50 to rotate the retaining nut 50 as the hand operator 60 is rotated. In the illustrated embodiment, the rear surface 88 of the retaining nut is adapted with a curved surface 90 to facilitate flexing the fingers 78 of the hand operator 60, as the hand operator 60 is slid over the retaining nut 50. The catch portion 82 is adapted with a corresponding angled surface to further facilitate the flexing the fingers 78 of the hand operator 60.

Referring again to FIG. 4, the electrode wire and gas are conveyed through the neck 48 to the nozzle assembly 52. In the illustrated embodiment, within the nozzle assembly 52 is an insulator 92, a diffuser 94, and a contact tip 96. Electricity from the welding cable 34 is coupled through an inner portion of the neck 48 to the contact tip 96. The contact tip 96 is used to conduct the electrical current from the power source into the electrode wire 30. The contact tip 96 also is used to guide the electrode wire. The diffuser 94 is used to establish the desired flow characteristics of the gas 26, e.g., pressure. The diffuser 94 may be connected to the neck 48 and the contact tip 96 secured to the gas diffuser 94. The insulator 92 is used to prevent electricity in the gas diffuser 94 from flowing to the welding gun 32 through an outer portion of the neck 48. The nozzle 52 is used to direct the gas 26 and wire 30 to the work piece 40.

It will be understood that the foregoing description is of preferred exemplary embodiments of this invention, and that the invention is not limited to the specific forms shown. For example, the retaining nut and/or hand operator may be formed of different materials than described. These and other modifications may be made in the design and arrangement of the elements without departing from the scope of the invention as expressed in the appended claims.

What is claimed is:

1. A securing system for securing a welding implement neck to a threaded connector, the securing system comprising:
a retaining nut having a plurality of wrench-flat surfaces to enable the retaining nut to be tightened onto the threaded connector with a wrench; and
a hand operator adapted to be releasably-secured to the retaining nut preventing axial separation therebetween, and to enable the retaining nut to be tightened onto the threaded connector by hand, the hand operator further having an internal peripheral surface configured to engage with wrench-flat surfaces to transfer torque applied to the hand operator to the retaining nut, wherein the hand operator is adapted to be snap-fit onto the retaining nut.

2. The system as recited in claim 1, wherein the retaining nut comprises a metal.

3. The system as recited in claim 2, wherein the metal comprises brass.

4. The system as recited in claim 1, wherein the hand operator comprises an electrically insulating material.

5. The system as recited in claim 4, wherein the hand operator comprises glass-filled nylon.

6. The system as recited in claim 4, wherein the hand operator comprises glass-filled polycarbonate.

7. The system as recited in claim 1, wherein the hand operator comprises at least one flexible securing member adapted to be deformed elastically as the hand operator is slid over the retaining nut.

8. The system as recited in claim 7, wherein the retaining nut comprises a curved surface adapted to deform the at least one flexible securing member.

9. A securing system for securing a welding implement neck to a threaded connector, the securing system comprising:
a retaining nut having first and second surfaces located non-adjacent to one another; and
a sleeve member having an outer peripheral surface and an inner peripheral surface configured to at least partially circumscribe the retaining nut, and having a resilient member extending and spaced apart from the inner peripheral surface, the resilient member being configured to releasably secure the sleeve member with respect to the retaining nut, wherein the inner peripheral surface is configured to engage with at least one of the first and second surfaces to transfer torque to the retaining nut in response to actuation of the sleeve member to tighten the retaining nut with respect to the threaded connector.

10. The securing system as recited in claim 9, wherein the inner and outer peripheral surfaces are generally non-deformable under manual actuation.

11. The securing system as recited in claim 9, wherein the sleeve member comprises a plurality of arcuate surfaces.

12. The securing system as recited in claim 11, wherein the sleeve member comprises ribs located intermediate consecutive arcuate surfaces.

13. The securing system as recited in claim 9, wherein the hand operator includes a central aperture having a polygonal profile.

14. The securing system as recited in claim 9, wherein a maximum separation distance between the inner and outer peripheral surfaces is greater than a maximum thickness of the resilient member.

15. A securing system for securing a welding implement neck to a threaded connector, the securing system comprising:
a hand operator having an inner peripheral surface configured to at least partially circumscribe a wrench-actuatable retaining nut such that actuation of the hand operator transfers torque to the wrench-actuatable retaining nut to secure the wrench-actuatable retaining nut to the threaded connector, wherein the hand operator includes a finger having a snap-fit portion configured to selectably block separation of the hand operator with respect to the wrench-actuatable retaining nut.

16. The securing system as recited in claim 15, wherein the hand operator comprises an electrically insulating material.

17. The securing system as recited in claim 15, comprising a welding implement.

18. The securing system as recited in claim 17, comprising the threaded connector.

19. The securing system as recited in claim 17, wherein the hand operator includes a ribbed surface interposed between substantially smooth surfaces.

20. A securing system for securing a welding implement neck to a threaded connector, the securing system comprising:

an operator configured to snap-fit with respect to a retaining nut, wherein the operator is configured to transfer torque to the retaining nut upon actuation of the operator to tighten the retaining nut with respect to the threaded connector, and the operator is adapted with a plurality of fingers that are adapted to flex as the operator is slid over the retaining nut and snap into a securing groove in the retaining nut to secure the operator to the retaining nut.

21. The securing system as recited in claim 20, wherein the operator is tool-lessly operable.

22. The securing system as recited in claim 20, wherein the operator comprises an electrically insulating material.

23. The securing system as recited in claim 22, wherein the operator comprises glass-filled nylon.

24. The securing system as recited in claim 22, wherein the operator comprises glass-filled polycarbonate.

25. The securing system as recited in claim 20, comprising the retaining nut.

26. The securing system as recited in claim 25, wherein the retaining nut comprises metal.

27. The securing system as recited in claim 20, comprising the welding implement neck, a welding gun configured to couple with the welding implement neck, a welding power source configured to couple with the welding gun, a wire feeder, or a combination thereof.

* * * * *